Nov. 9, 1943.  C. W. LEGUILLON ET AL  2,334,105
METHOD AND APPARATUS FOR MAKING ARTICLES
Filed July 29, 1939    7 Sheets-Sheet 1
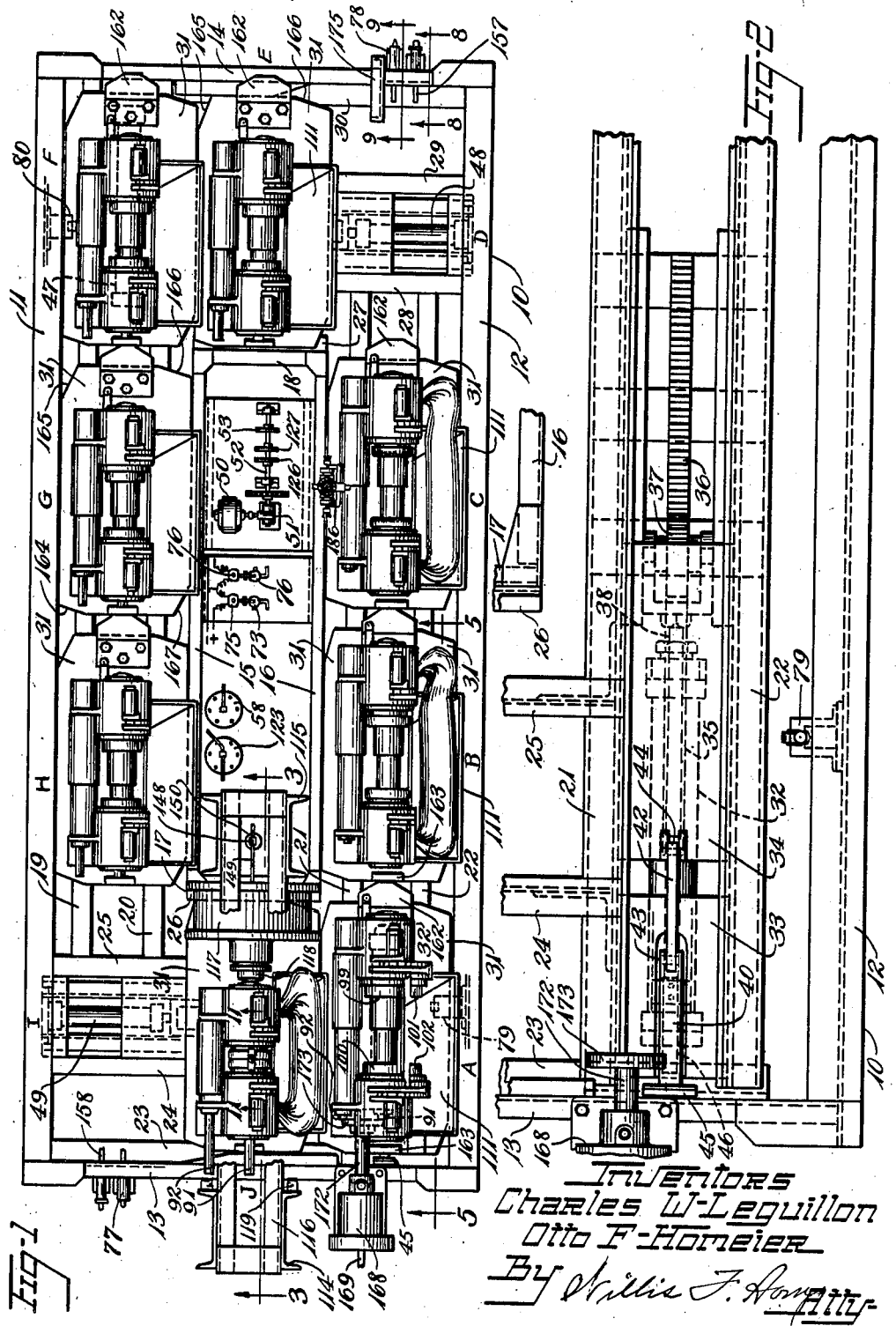

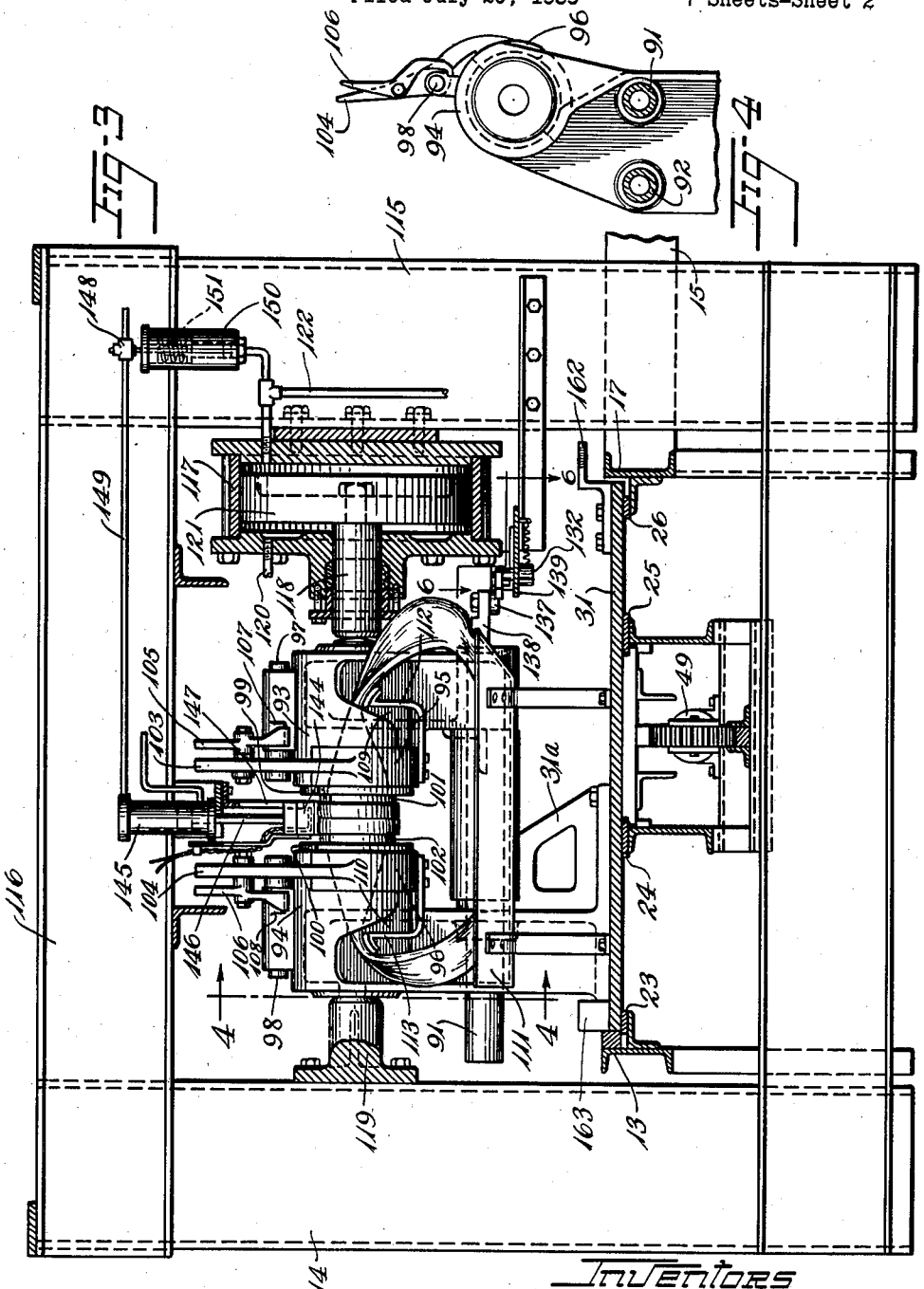

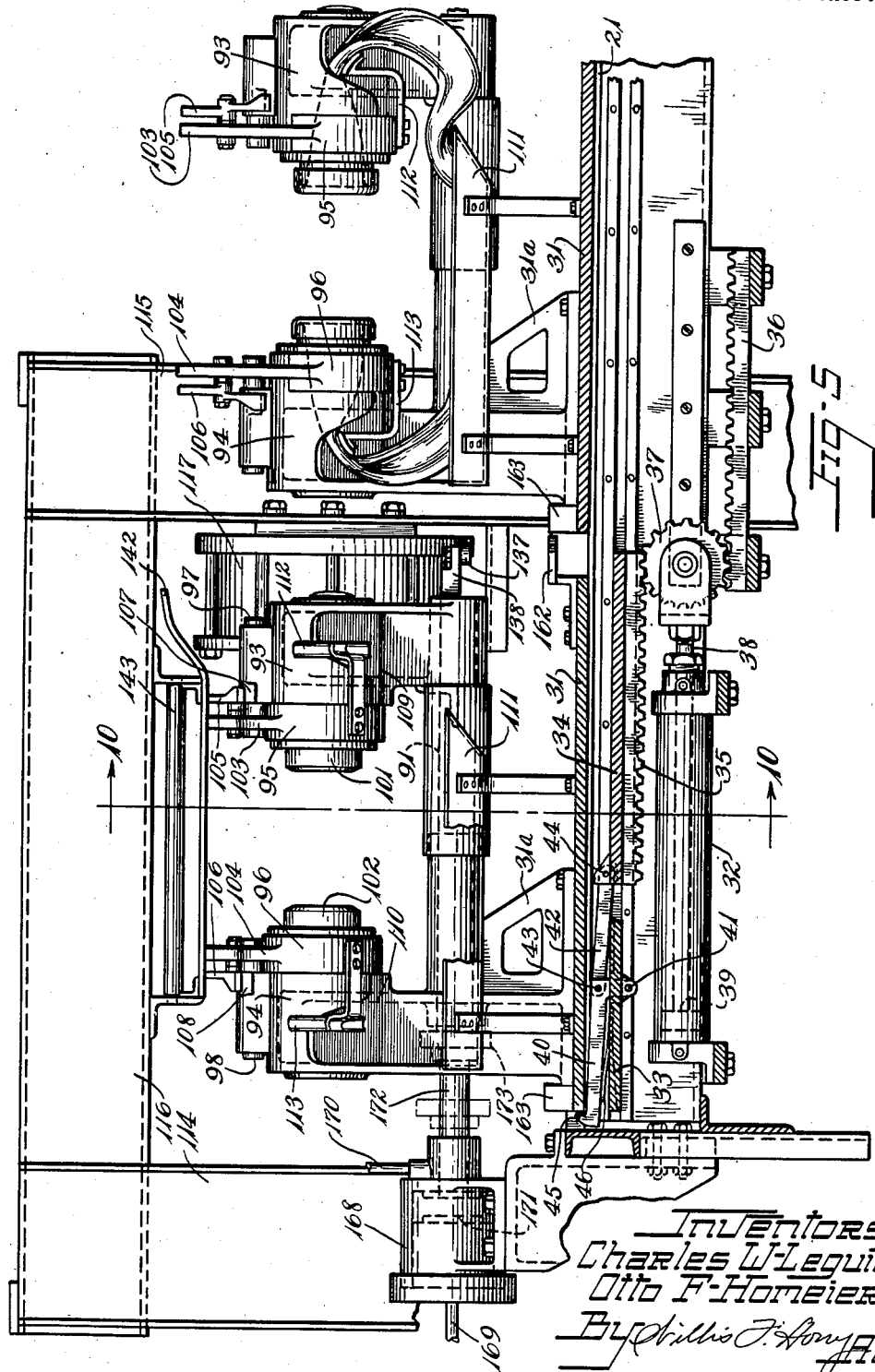

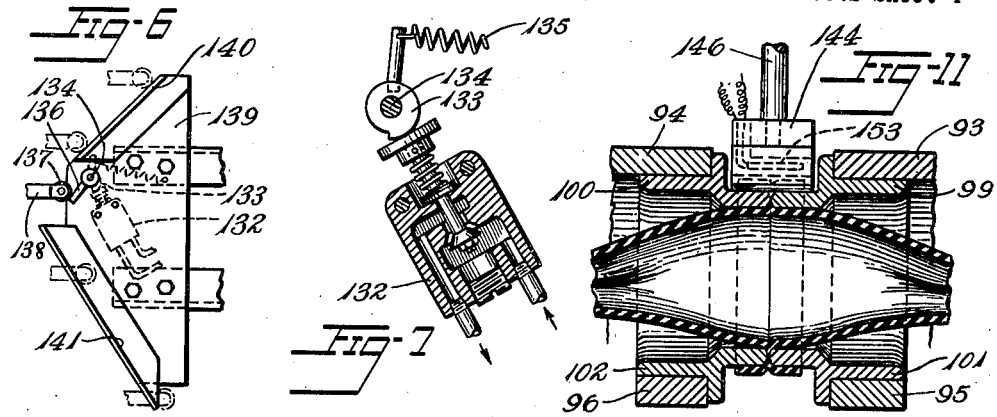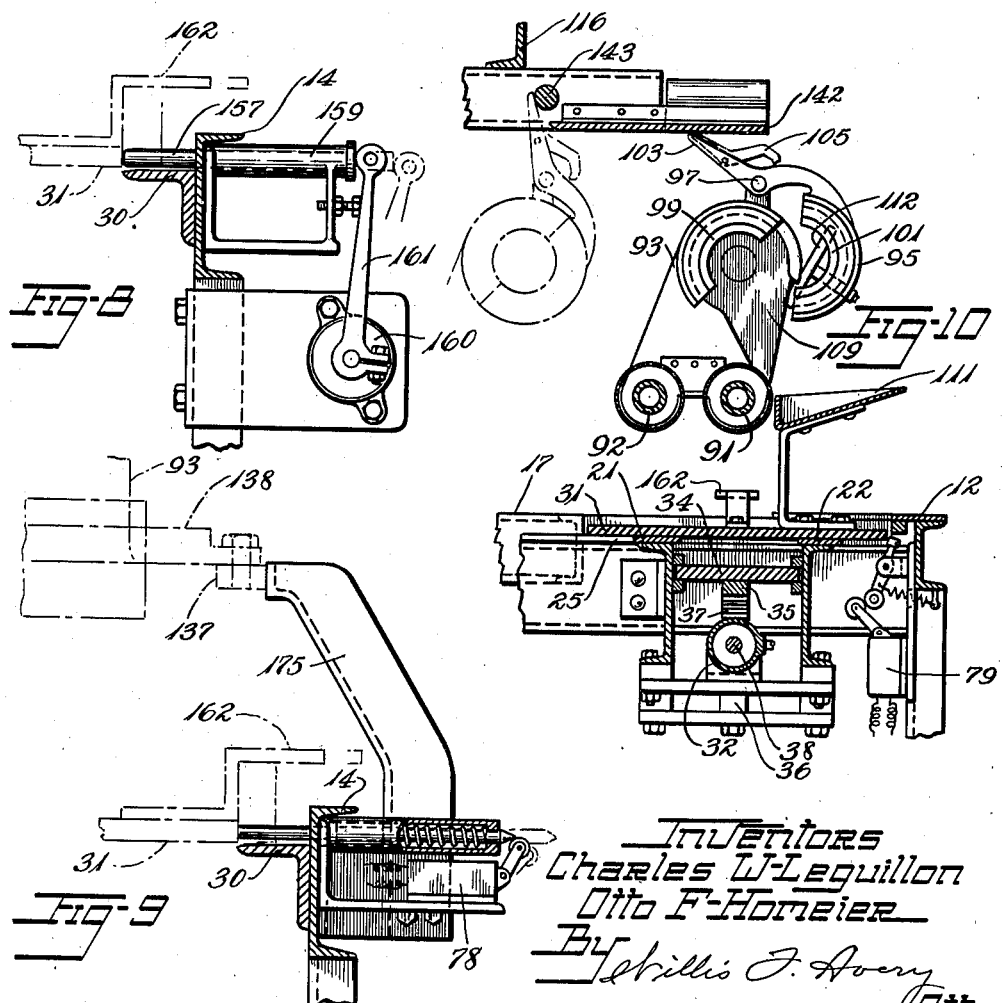

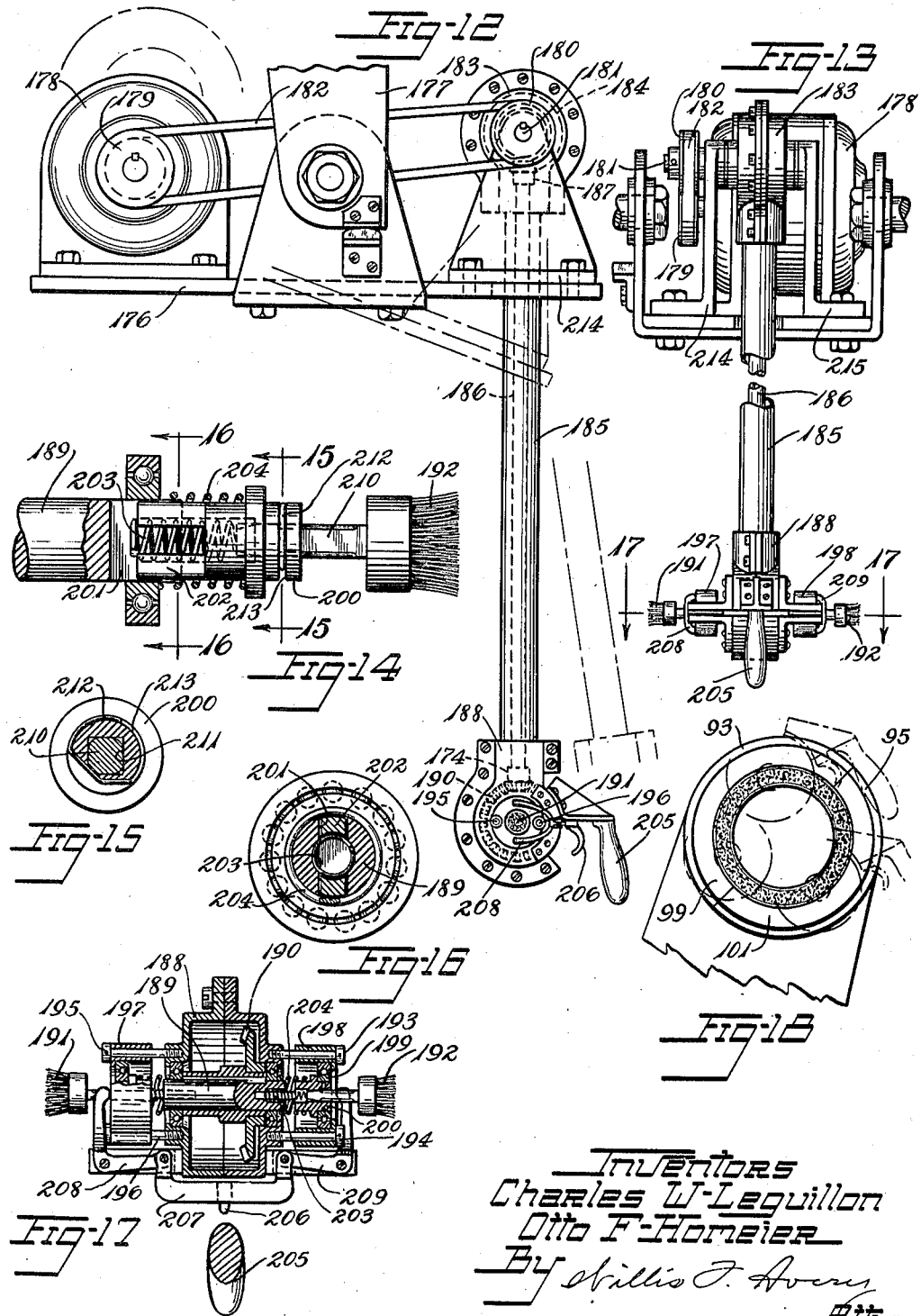

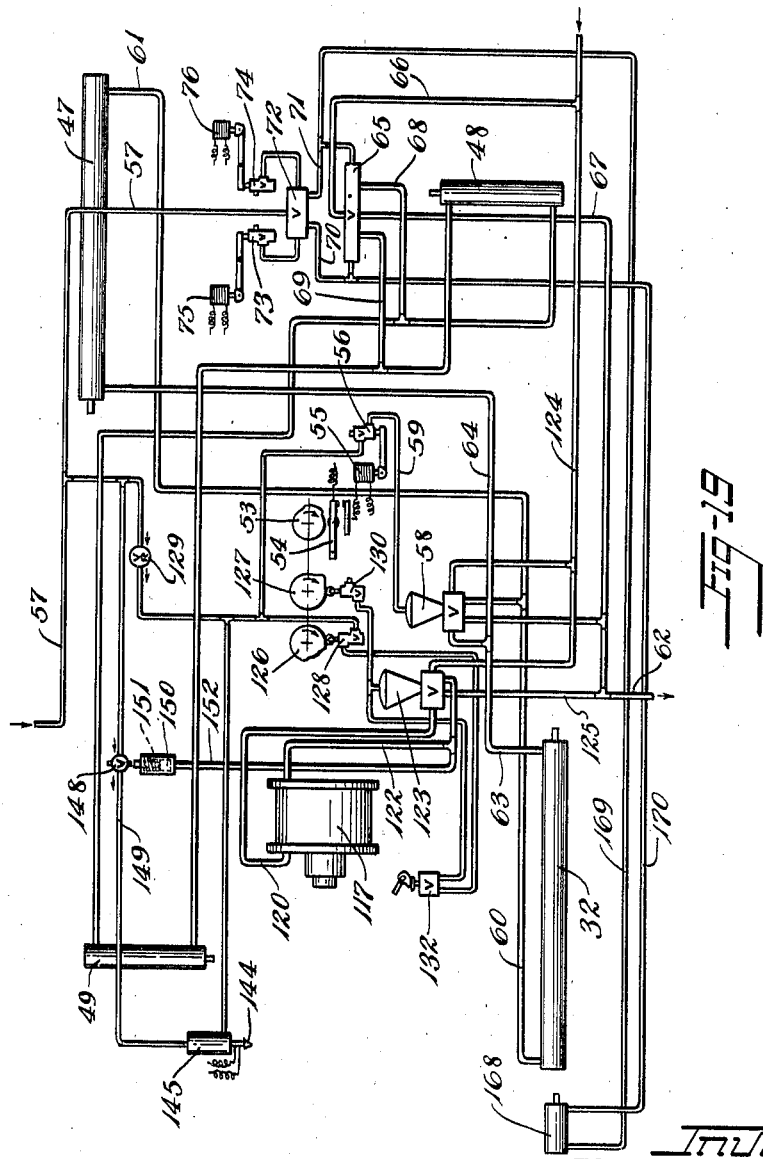

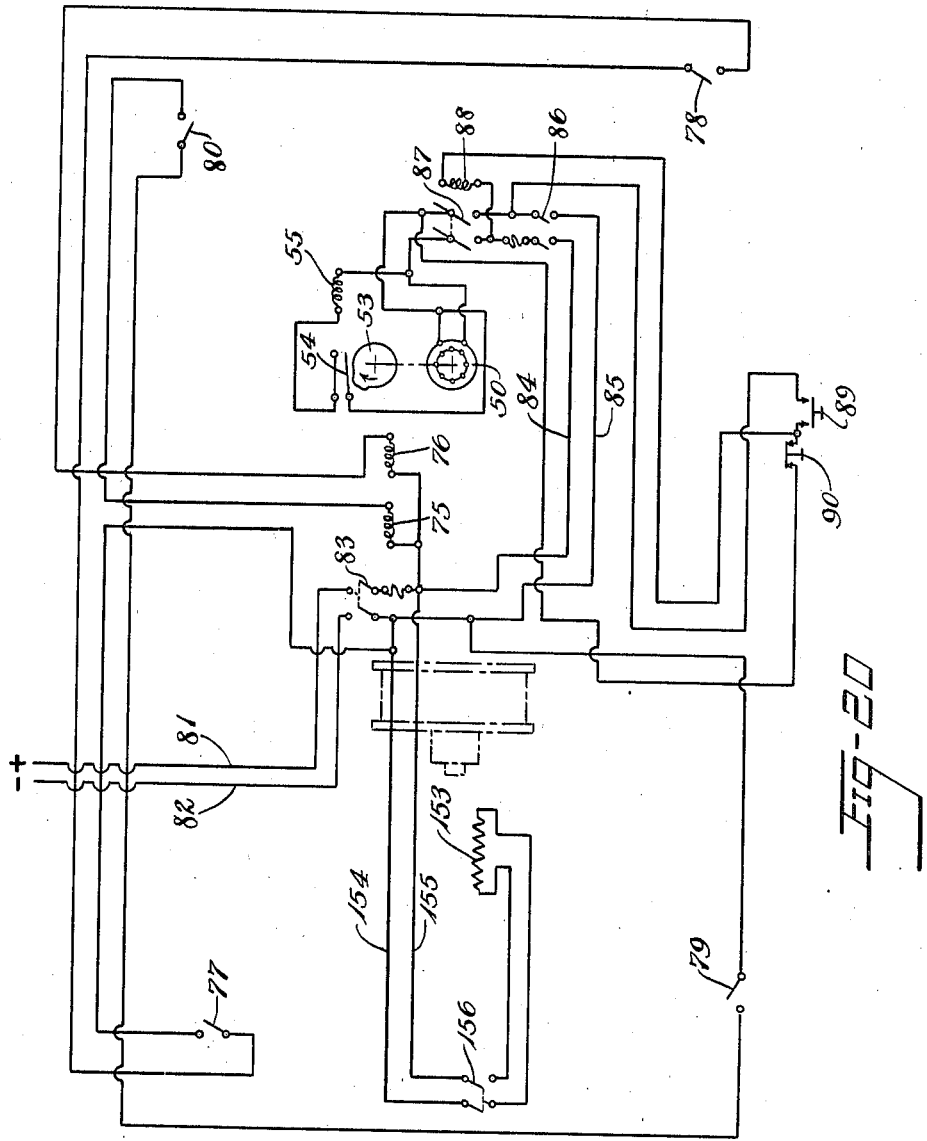

Patented Nov. 9, 1943

2,334,105

UNITED STATES PATENT OFFICE 2,334,105

METHOD AND APPARATUS FOR MAKING ARTICLES

Charles W. Leguillon and Otto F. Homeier, Akron, Ohio, assignors to The B. F. Goodrich Company, New York, N. Y., a corporation of New York Application July 29, 1939, Serial No. 287,329

16 Claims. (Cl. 154—9)

This invention relates to methods and apparatus for making articles and is especially useful in the manufacture of articles such as tire elements comprising rubber-like material.

In the manufacture of many articles, such as tire inner tubes and tire casings and the like employing rubber-like plastic materials, it is usually required that the manufacture be divided into a series of building operations.

In accordance with the invention a plurality of work supporting and manipulating units are mounted for movement in determinate course past a succession of stations where steps in the manufacturing operation are performed. Chief objects of the invention are to provide flexibility and simplicity of construction and arrangement such that the individual work supporting units are readily removable and replaceable and are not rigidly secured to a conveyor system, to provide an arrangement such that power mechanism need not be transported but may be applied to traveling work supporting and manipulating units presented to it, and to provide flexibility in the positioning of the units such that operating power at a station will be effectively applied even though the unit arrives only approximately aligned at the station.

Further objects are to provide procedure and apparatus for splicing inner tubes with facility and uniformly high quality results, and especially to provide for utilizing most effectively on a large quantity production basis the tube splicing procedure of Leguillon Patent No. 1,921,623, granted August 8, 1933, which is directed to a procedure utilizing an aqueous dispersion of rubber in a manner to obtain strong splices.

These and other objects will appear from the following description and the accompanying drawings.

Of the drawings

Fig. 1 is a plan view of an example of apparatus embodying the invention as applied to a tube-splicing apparatus.

Fig. 2 is a plan view to a larger scale, of a portion of the frame and one of the mechanisms for feeding work-manipulating machines lengthwise thereof, other parts of the apparatus being broken away, the carriages being removed to show the feeding mechanism.

Fig. 3 is an enlarged sectional elevation taken on line 3—3 of Fig. 1 showing the mechanism at the pressing station.

Fig. 4 is a detail sectional view taken on line 4—4 of Fig. 3 showing the die latching mechanism, other parts being broken away.

Fig. 5 is an enlarged sectional elevation, taken on line 5—5 of Fig. 1 showing the mechanism of feeding the work-manipulating machines longitudinally of the frame, parts being broken away.

Fig. 6 is a plan of the safety valve and die operating cams.

Fig. 7 is a detail sectional plan view of the valve of Fig. 6.

Fig. 8 is an enlarged detail sectional elevation of the shock absorber mechanisms, taken on line 8—8 of Fig. 1, other parts being broken away.

Fig. 9 is an enlarged detail view of the switch for operating the cross-feed and the bracket for partially closing the seaming dies, taken on line 9—9 of Fig. 1, other parts being broken away.

Fig. 10 is a detail cross-sectional elevation showing the die unlatching mechanism and one of the feeding cylinder reversing switches, taken on line 10—10 of Fig. 5, other parts being broken away.

Fig. 11 is an enlarged longitudinal vertical section of the seaming dies, taken on line 11—11 of Fig. 1 showing the heated knife for severing the waste material.

Fig. 12 is a side elevation of the buffing mechanism, showing in dot-and-dash lines its operative position.

Fig. 13 is an end elevation of the same.

Fig. 14 is a detail view of one of the brushes and its drive shaft, parts being broken away and parts shown in section.

Fig. 15 is a sectional view taken on line 15—15 of Fig. 14.

Fig. 16 is a sectional view taken on line 16—16 of Fig. 14.

Fig. 17 is an enlarged cross sectional view, taken on line 17—17 of Fig. 13.

Fig. 18 is a face view of one of the die members with a tube cuffed thereover showing in dot-and-dash lines various positions of the buffing mechanism.

Fig. 19 is a piping and valve diagram.

Fig. 20 is a wiring diagram.

The invention includes the provision of a series of work-supporting and manipulating units or machines adapted to be actuated to perform operations on the work carried thereby, means for feeding the work-supporting units or work-manipulating machines in a determinate course, and means at stations for actuating the work-manipulating machines and for cooperating with them in the course of their travel to complete operations thereupon. The work-supporting units are independent of one another in construction, the parts and mechanism of each unit being mounted on an independent base adapted to be guided and moved along in the procession of units. The movement of the units is preferably intermittent so as to provide time for the performance of operations at the various stations in the course of travel. These and other features of the invention will be apparent upon consideration of an illustrative example of its application, and the drawings illustrate the invention as applied to the splicing of unvulcanized tire inner tubes in annular form prior to vulcanization.

In the drawings, the numeral 10 designates the table-like frame of the machine which may conveniently be formed of structural steel. The frame is of rectangular shape and is provided around its periphery with longitudinal members 11, 12 and lateral members 13, 14 providing fences for guiding and retaining the movable pressing units. Within the area defined by these fences and centrally located with respect thereto are shorter longitudinal fence members 15, 16 and lateral members 17, 18 defining a rectangular fence of the same elevation as the fence members 11, 12, 13, 14. The space between the two rectangular fences provides a path around which the tube seaming units are guided. Below the fences a sufficient distance to prevent escape of the seaming units, are longitudinal rails 19, 20, 21, 22 and lateral rails 23, 24, 25, 26, 27, 28, 29, and 30 all fixed to the frame and at the same level over which the tube seaming units may slide, the spaces between the rails permitting travel of means for propelling the seaming units.

The tube-seaming units each comprises a flat general rectangular base 31 adapted to slide endwise between the fences 11 and 15 or 12 and 16 and sidewise between fences 13 and 17 or 14 and 18.

To provide for moving the units step by step along the tracks provided therefor, a feeding mechanism is provided along each run of tracks for pushing a line of the units therealong. One of these feeding units is shown in Fig. 5 and comprises a double-acting fluid pressure cylinder 32 fixed to the frame below the rails. A pair of crossheads 33, 34 are mounted to slide lengthwise of the rails 21, 22 in guideways provided therealong. Crosshead 34 has a rack 35 fixed to its lower face. A similar stationary rack 36 is mounted between the rails 21, 22. A pinion 37 is rotatably mounted on the end of the piston rod 38 attached to the piston 39 in the cylinder 32. The arrangement is such that the pinion 37 is engaged with both racks at all times and as the piston is advanced and retracted, the crosshead 34 is advanced and retracted in the same direction but moves twice as far as the stroke of the piston and at twice the velocity. A pawl 40 is pivoted, as at 41, to crosshead 33. A link 42 is pivotally connected between pawl 40 to which it is pivoted at 43 and crosshead 34, to which it is pivotally connected, as at 44. The arrangement is such that as crosshead 34 is advanced it raises the hooked end 45 of pawl 40 so as to engage back of the plate 31 and thereafter acts to propel the plate 31 along the rails, and as the crosshead 34 is retracted the plate 31 remains stationary, the pawl 40 is depressed, and returns to its original position. The rear face of the hook 45 is bevelled so as to cause it to be depressed should it strike one of the plates 31 in its retracting movement. A spring 46 acts to hold the pawl in raised position. The arrangement is such that a series of work-manipulating machines may be advanced along the rails as a train, the hooked pawl engaging the back of the last machine in the train and pushing the entire train, each machine contacting with and advancing the machine ahead of it.

A similar feeding mechanism is located between rails 19, 20 and is similarly actuated by a fluid pressure cylinder 47 to advance the work-manipulating machines in the opposite direction along rails 19, 20.

For feeding the work-manipulating machines from the rails 19, 20 to the rails 21, 22 over rails 24, 25 a cylinder 49 and similar rack and pinion actuated pawl, as illustrated in Fig. 3, is employed and for feeding the machines from rails 21, 22 to rails 19, 20 over rails 28, 29 a cylinder 48 and similar rack and pinion actuated pawl is provided at the opposite end of the frame 10. The cylinders 32, 47, 48 and 49 are preferably supplied with pressure fluid at high pressure and for convenient control of the high pressure fluid the valves controlling the same are operated by a low pressure air supply which in turn is controlled electrically.

For automatically timing the movements of the work-manipulating machines about the track in step by step movements so as to permit operations being performed at the various stations, a timing device is located on the frame of the apparatus and comprises an electric motor 50, a reducing gear 51, and a cam shaft 52 driven thereby. Mounted on the cam shaft is a timing cam 53 adapted to open and close a switch 54. This cam is preferably adjustable so as to cause the switch 54 to remain closed for any desired period of time, such cams being well known in the art and requiring no further description. closing of the switch 54 energizes a solenoid 55 which when energized lifts a valve 56 which permits air to flow from a line 57 to a diaphragm operated hydraulic valve 58 through a pipe 59. As long as valve 58 is supplied with air under pressure through valve 56 cylinders 32, 47 are supplied with water under pressure through pipes 60, 61 and their pistons are advanced. When cam 53 opens switch 54, solenoid 55 is de-energized closing valve 56 and opening a slow leak vent in pipe 59, whereupon valve 58 shifts to a position where pipes 60, 61 are opened to an exhaust pipe 62 and water under pressure is supplied to the forward ends of cylinders 32 and 47 through pipes 63, 64 causing the pistons to be retracted. As cylinders 32 and 47 work in unison, machines in the two longitudinal trains on rails 19, 20 and rails 21, 22 are moved simultaneously in opposite directions.

To transfer machines from rails 19, 20 to rails 21, 22 and from rails 21, 22 to rails 19, 20, cylinders 48, 49 are also operated simultaneously. For this purpose a piston type valve 65 is supplied by hydraulic pressure through a pipe 66 and is connected by a pipe 67 to the exhaust line 62. A pipe 68 connects the valve to the rear ends of cylinders 48, 49 and a pipe 69 connects the valve to the forward ends of the same cylinders. Air under pressure is supplied to each end of the valve 65 through pipes 70, 71 and a piston valve 72 from the air supply 57. A pair of normally closed bleeder valves 73, 74 are connected to opposite ends of the cylinder of valve 72 but are adapted to be opened by solenoids 75, 76. A pair of normally open switches 77, 78 are wired in series in the circuit including solenoid 76 and are located on the ends of the frame 10 of the apparatus where they may be closed by contact with work-manipulating machines. A pair of similar switches 79, 80 are wired in series in a circuit including solenoid 75 and are located on the sides of the frame 10 of the apparatus in position to be closed by work-manipulating machines contacting therewith. The arrangement is such that closing of both switches 77, 78, but not one only, will energize solenoid 76 opening valve 74 and causing the pistons of cylinders 48, 49 to advance and closing of both switches 79, 80, but not one only, will energize solenoid 75 and cause pistons of cylinders 48, 49 to retract.

Assuming that the advancing movement of cylinders 32, 47 is equal to the length of one of the work-manipulating machines and the advancing movement of the cylinders 48, 49 is equal to the width of a work-manipulating machine, and that the tracks in each direction of travel are filled to one machine less than the length of the track, as illustrated in Fig. 1, rotation of the cam shaft 52 will cause the valve 56 to open causing cylinders 32, 47, to advance the trains of machines on the lengthwise tracks until the leading machines contact with switches 77, 78, whereupon cylinders 48, 49 will be operated to transfer the leading machines to the cross tracks. Upon the leading machines on the cross tracks being advanced to contact with and close switches 79, 80, the pistons of cylinders 48, 49 will be retracted so as to be in position to engage the next machines.

As action of cylinders 48, 49 are dependent on the presence of machines contacting with the actuating switches which control them, timing of their operation is dependent upon operation of cylinders 32, 47 which in turn is dependent upon the setting of the cam 53.

Current for operating the motor 50 and energizing the valve operating solenoid is taken from supply lines 81, 82 through a master switch 83 from which branch lines 84, 85 supply the motor 50 through a hand operated knife switch 86 and a normally open soelnoid switch or breaker 87 the solenoid 88 of which is shunted across the lines 84, 85 through a normally closed stop switch 90 located for convenient operation by one of the operators of the apparatus, when the solenoid switch is closed, and through a normally open starting switch 89 of the push button type when the solenoid switch 87 is open. The arrangement is such that with switch 87 open, closing of starting switch 89 energizes solenoid 88 to close switch 87. Release of the button opens the solenoid circuit through the starting button but the solenoid is still energized through the stop button circuit. Pressing of the stop button deenergizes the solenoid 88 and switch 87 opens, stopping the motor.

The apparatus of the invention is especially useful in the manipulation of tire inner tubes or other articles where cut-seaming operations are to be performed. For this purpose each work-manipulating machine may be provided with a pair of seaming dies and may be constructed as follows:

Fixed to the plate 31, is a rigid bracket 31a which supports a pair of parallel guide rods 91, 92 extending lengthwise of the base plate and parallel thereto. A die-head 93 is slideably mounted upon the rods. The bracket 31a is formed at its top with a corresponding die-head 94. These die heads are of semi-cylindrical form and have complementary semi-cylindrical caps 95, 96 hinged thereto at the top as by pivot pins 97, 98. Each die head has a semi-circular seaming die 99, 100 mounted therein, and each cap has a complementary die 101, 102 mounted thereon, the dies together providing a pair of opposed circular cut-seaming faces for cooperating to cut-seam the ends of a tube together, as illustrated in Fig. 11. Each cap has a projecting handle 103, 104, by means of which its die members may be swung toward or from each other, and each arm has a latch 105, 106, pivoted thereto for detachably engaging a lug 107, 108 on each die-head to hold the individual circular dies in assembled relation. The latches have operating handles which in the latched position extend upwardly as do the handles on the caps.

To permit placing and removal of a tube, each die-head is cut away on one side toward its cap, as at 109, 110 to provide an opening. A trough-like shelf 111 is supported from the plate 31 to support the free portion of the tube. Supports 112, 113 are attached to the cap members and are removable into the spaces 109, 110 with the closing of the caps to support the tube near the dies.

In use the ends of the inner tube are inserted from the openings 109, 110 through the dies and are cuffed back over the projecting cutting faces of the dies as seen in Fig. 5. The dies may then be pressed toward each other to seam the ends of the tube together and to cut the excess material of the cuffs away. Thereafter the caps 95, 96 may be swung to open position to release the tube.

To provide for applying pressure to the dies, the frame of the apparatus is provided with vertical columns 114, 115 between which the machines must pass in their travel of the circuit. A tie beam 116 connects the top of the columns to prevent spreading. Mounted on the column 115 is a hydraulic cylinder 117 with its piston rod 118 aligned at a level with the axis of the dies. A bolster 119 is fastened to the opposite column 114 in alignment with piston rod 118. The arrangement is such that when the dies are moved close together and the piston rod retracted, sufficient space is provided to just clear the tube seaming machine as it travels along rails 24, 25, and by means of the cylinder 117 pressure may be applied to the dies of a tube seaming machine therebetween to seam the tube, even though the alignment of the machine unit may be only approximate. Fluid pressure may be applied to the front of cylinder 117 through a pipe 120 to retract the piston 121 therein, and through a pipe 122 to the rear of the cylinder to advance the piston. Supply of fluid pressure to cylinder 117 is controlled by a four-way diaphragm-operated valve 123 connected to the cylinder by pipes 120, 122 and to a pressure line 124 and a pipe 125 to exhaust line 62. The hydraulic valve is operated by air pressure applied thereto, the arrangement being such that when air is applied to the valve 123 the piston rod 118 is advanced and when no air pressure is applied, the piston rod 118 will be retracted.

In order to provide for accurately timing the application of pressure to the splice of the article a pair of cams 126, 127 are adjustably mounted on the cam shaft 52, previously described. Cam 126 is adapted to open a valve 128 to supply air under pressure from line 57 to valve 123. A pressure reducing valve 129 regulates the pressure of the air. Cam 127 is adapted to open a bleeder valve 130 to release the pressure on valve 123 and thereby retract the piston rod 118. The arrangement is such that each of cams 126, 127 have a projection adapted to operate the respective valves and the cams may be rotated about the shaft 52 and set for any desired time interval during which pressure is applied to the seaming dies.

To prevent pressure being applied to the seaming dies except when a tube seaming machine is in place opposite the piston rod 118, a normally closed valve 132 is located in the pressure line between valve 123 and valve 128 (see Figs. 6 and 7). A cam 133 is rotatably mounted on a vertical shaft 134 and is held by a coil spring 135 in such position as to permit the valve 132 to remain closed. A lever 136 is fixed to shaft 134 and extends in the path of a roller 137 rotatably mounted on an arm 138 of the tube seaming machine. When the tube seaming machine is in proper pressing position, the roller 137 deflects the arm 136 to a position where cam 133 opens the valve 132 so that air under pressure may pass to valve 123. Arm 138 is also adapted to close the dies to nearly their cutting position so as to reduce the stroke of the piston 118 and avoid shock. For this purpose the arm 138 is fixed to the movable die-holder 93. A stationary cam plate 139, through which shaft 134 is journaled, is fixed to frame member 115. A diagonally disposed cam surface 140 (see Fig. 6) is fixed to the cam plate in the path of roller 137. As the tube-splicing machine approaches the pressing station, the roller 137 engages the cam surface 140 and moves the die-holder 93 toward the die-holder 94. A second diagonally disposed cam surface 141 is also fixed to the plate 139 and is adapted to engage the roller 137 to separate the dies after the seaming operation. As the tube-seaming machine leaves the pressing station the roller 137 releases the arm 136 and engages back of the cam surface 141 forcing the dies apart.

Means are provided for automatically unlatching and opening the dies as they leave the pressing station. For this purpose a cam plate 142 (see Figs. 5 and 10) is fixed to the cross-beam 116 at such a height as to engage the arms 103, 104 and the latch arms 105, 106. A roller 143 is mounted on the plate 142 to initially engage these arms. As the tube-seaming machine leaves the pressing station the roller first engages the latch arms, releasing the latches, and then engages the arms of the caps, permitting the seamed tube to drop from the machine. The right end of the plate 142, as seen in Fig. 5, is sloped upwardly to gently release the caps after the tube splicing machine leaves the releasing station, permitting the dies to close to latched position without excessive shock.

As the excess tube material cuffed back over the dies is severed from the tube by the seaming dies and is in ring form encircling the tube, it is desirable to provide means for cutting this ring of waste material so that it may be removed. For this purpose, an electrically heated knife 144 (see Figs. 3 and 11) is mounted above the seaming dies at the pressing station and means is provided for forcing it against the outer surfaces of the dies over which the tube is cuffed. For this purpose an air operated vertical pressure cylinder 145 is fixed to the beam 116 and the knife 144 is mounted on its piston rod 146 and is guided against rotation by a guideway 147 fixed to the cylinder, the knife sliding in a vertical slot in the guideway. A normally closed valve 148 in a pipe 149 is adapted to supply air under pressure from the line 57 to the top of the cylinder. This valve is adapted to be opened by an operating cylinder 150. A spring 151 in the operating cylinder holds the piston thereof normally retracted. A pipe 152 connects the cylinder to pipe 122 from valve 123. As water from valve 123 forces the piston 118 forward the water pressure in the line is too low to operate the piston in cylinder 150 against the resistance of spring 151. When piston 118 finishes its forward movement and the dies are together, pressure in line 152 builds up to a point where valve 148 is opened and the knife 144 is forced downwardly. The lower end of cylinder 145 is connected to the air supply line between the regulating valve 129 and the valve 128 so as to receive pressure at all times. This holds the knife up when the valve 148 is closed. When valve 148 is open, the knife is forced down by the difference in pressure at opposite sides of the regulating valve. To insure its return to its upward position valve 148 is provided with an exhaust vent which is opened to pipe 149 when the valve is closed. The knife 144 has a resistance coil 153 which is heated by current from lines 81, 82 through branch lines 154, 155 through a hand operated switch 156.

To avoid shocks and consequent rebound when the work-manipulating machines reach the end of their travel in one direction and are to be advanced in a different direction, buffer pins 157, 158 are slideably mounted at the ends of the long runs in brackets such as 159 (see Fig. 8) attached to the frame of the apparatus. A shock absorber 160 is also mounted on the frame and has an arm 161 adapted to engage the buffer pin to cushion the same. These shock absorbers may be of the well known hydraulic resistance and spring return type such as are used on door checks, automobiles and other apparatus.

To provide space between the work-manipulating machines for latch 45 to enter therebetween and to provide space for passing the manipulating members without interfering with the buffer pins, an offset bracket 162 is provided on the leading end of each work-manipulating machine, and a block 163 is mounted on the opposite end for engaging the offset bracket on the next machine.

The corners of the base 31 of the machines are chamfered as at 164, 165, 166, and 167 to prevent interference with the corners of the inside guide fences.

Where it is desired to separate the die holders of the tube-seaming machines further than they can conveniently be opened and closed by the cams 140, 141, in the available travel, additional opening and closing means may be provided. For this purpose a fluid pressure cylinder 168 may be fixed to the frame of the apparatus at the unloading station. Its respective ends are connected by pipes 169, 170 to pipes 71 and 70 respectively so that it is operated in unison with cylinders 48, 49, the arrangement being such that when switches 79, 80 are closed by the presence of tube-seaming machines at the unloading station and the diagonally opposite station so as to retract the feeding members actuated by cylinders 48, 49, the piston 171 of cylinder 168 is advanced. The piston rod 172 has a flange 173 fixed thereto which engages the projecting end of rods 91, 92 fixed to the die holder 93 and slideably mounted in the bracket 31a. The flange being of greater area than the end of the rods engages the rods to effect the opening movement even though such parts may be out of alignment.

For effecting additional closing movement of the tube-seaming machines an arm 175 (see Fig. 9) may be fixed to the frame of the apparatus at the end of rails 21, 22 in a position to engage the roller 137 on arm 138 of the machine in advance of the contact of the base plate 31 of the machine with the end frame, thereby causing the die holder 93 to be moved closer to the die holder 94.

In the splicing of inner tubes, after the ends of the tube have been inserted in the dies and have been cuffed thereover, the exposed portions of the inside of the tube are cleaned and coated preferably with an aqueous dispersion of rubber compositions to promote adhesion. It has been found that the dispersed coating should be scrubbed with a brush to obtain the best results, as is set forth in Leguillon Patent No. 1,921,623. For this purpose power-operated scrubbing means may be provided. A swinging platform 176 is pivotally mounted on a bracket 177 above one of the stations and carries an electric motor 178 at one end and a pair of shaft-supporting brackets 214, 215, for rotatably supporting a shaft 181 at the other. A pulley 179 on the motor drives a pulley 180 fixed to the shaft 181, through a belt 182. A split housing 183 is pivotally mounted on the shaft 181 about a gear 184 fixed to the shaft. A tube 185 extending from the housing radially of shaft 181 houses a shaft 186 on which a pinion 187 is fixed in position to engage the gear 184. The tube 185 supports a housing 188 at its lower end. This housing encloses a rotatable shaft 189 on which is fixed a bevel gear 190. A pinion 174 fixed to shaft 186 drives the shaft 189 through gear 190. Shaft 189 is used to rotate a pair of removable scrub brushes 191, 192 adapted to engage simultaneously the opposed faces of the tube ends.

To provide for controlling the distance between the working faces of the opposite brushes to permit their insertion between the tube ends, a pair of guide rods 193, 194 are fixed to one end of the housing and a similar pair of guide rods 195, 196 are fixed to the opposite end, all of the guide rods being parallel to the shaft 189. A pair of carriages 197, 198 are slideably mounted on these rods, one at each end of the housing. The carriages are similar and each is bored concentrically with the shaft 189 to receive a ball race 199 in which a chuck 200 is rotatably mounted. Each end of the shaft 189 is diametrically slotted as at 201 to slideably engage a tang 202 of the chuck and is axially bored to receive a brush ejector spring 203. A coil spring 204 encircles the shaft 189 and chuck 200 and extends between shoulders on each to hold the carriages 197, 198 apart.

A handle 205 is fixed to the housing 188 for manipulating the brushes with respect to the work. A trigger lever 206 located adjacent the handle and pivotally mounted on the housing is fixed to a yoke 207 the ends of which are pivotally connected to a pair of bell-crank levers 208, 209 pivoted on the housing 188. The free ends of the bell cranks are bifurcated and bear against the outer faces of the carriages 197, 198. The arrangement is such that when the trigger 206 is pulled toward the handle 205 the carriages are forced toward each other, and when the trigger is released the springs 204 force them apart.

The brushes 191, 192 have axially extending wire bristles. Their shanks are squared as at 210 and engage in squared sockets 211 in chucks 200 where they rest against the compressed ejector springs 203. A latch spring 212 engages a groove 213 in the chuck and is retained in the groove under tension. At one side of the chuck the groove 213 is deepened so as to intersect the squared bore 211 and the latch spring frictionally engages a notch in the squared shank of the brush to retain the same. The brushes may be pulled from their chucks at will so as to be readily replaced by others.

In using the scrubbing apparatus the handle 205 is grasped by the operator who depresses the trigger 206 and swings the apparatus between the cuffed ends of the tube. The operator then releases the trigger and moves the brushes in a rotary path as indicated in the dot-and-dash lines of Fig. 18. When the scrubbing process is completed the trigger is again pressed and the scrubbing apparatus is swung out of the way.

The operation of the apparatus is as follows: A tube splicing machine at station A discharges a spliced tube, its dies close, its die holders are moved apart the full distance by cylinder 168, and by closing switch 77 it is moved along rails 21, 22 to station B. At station B an operator inserts the ends of a tube in the dies and cuffs them over the dies whereupon the machine moves to station C. At station C the operator applies a coating of aqueous dispersed rubber to the cuffed tube ends and operates the scrubbing means as hereinabove described, and the machine is removed to station D. As the machine arrives at station D it closes switch 80 and its die holders are moved closer together and it is immediately moved to station E. By successive movements the machine unit is then moved through stations F to I, thus giving time for the coating on the rubber to dry to the desired tacky condition. At station I the unit contacts with switch 79 which it closes and it is immediately moved to station J between the pressing mechanism. During the last movement, its die holders are moved together by cam 140 and safety valve 132 is opened. The piston 118 advances and presses the dies together. Thereafter the heated knife descends and cuts away the waste material of the cuffs. After a proper time interval has expired as determined by the setting of cams 126, 127 the heated knife is withdrawn and the piston rod 118 is withdrawn and the machine is moved to station A. During this last movement the die holders are separated by cam 141 and the dies are unlatched and opened so that the spliced tube drops out. At stations A and F the machines close switches 79 and 80 and cylinders 48 and 49 are retracted.

It will be understood that while the invention is especially useful in the splicing of inner tubes, many features are applicable to the manufacture of other articles.

Variations may be made without departing from the scope of the invention as it is defined by the following claims:

We claim:

1. Manufacturing apparatus comprising a plurality of stations for performing successive operations upon work presented thereto, a plurality of work-supporting units each capable of independent movement and each comprising work-manipulating elements mounted thereon for relative movement and requiring connection to power means for operation thereof, means for advancing said units from station to station, and power means at a station engageable with a unit presented in approximate alignment with it for operating said elements to perform an operation upon the work.

2. Apparatus for uniting the ends of a tubular body of plastic composition, said apparatus comprising a plurality of independently movable tube splicing machines, and means for advancing the machines step by step about a defined polygonal course and for effecting a dwell thereof between successive movements, each tube splicing machine comprising a pair of opposed annular seaming dies of split construction, and means at a station along the course for pressing the opposed dies together during a dwell of the machine between movements.

3. Apparatus for uniting the ends of a tubular body of plastic composition, said apparatus comprising a plurality of independently movable tube splicing machines, and means for advancing the machines step by step about a defined course past a series of operating stations and effecting a dwell thereof at a station between successive movements, each tube splicing machine comprising a pair of opposed annular cutting and seaming dies of split construction, means at a station along the course for pressing the opposed dies together during a dwell of the machine between movements, means for holding the split dies latched during the pressing operation without continued application of said pressing means, and means for automatically unlatching and opening the dies to discharge the tube during a subsequent movement of the machine.

4. Apparatus for uniting the ends of a tubular body of plastic composition, said apparatus comprising a plurality of independently movable tube splicing machines, and means for advancing the machines step by step about a defined course and for effecting a dwell thereof between successive movements, each tube splicing machine comprising a pair of opposed annular seaming dies having means for supporting tube ends in cuffed relation, means at a station along the course for pressing the opposed dies together during a dwell of the machine between movements, and means at the same station for severing the waste material supported by said dies.

5. Apparatus for uniting the ends of a tubular body of plastic composition, said apparatus comprising a plurality of tube splicing machines, and means for advancing the machines step by step about a defined course, each tube splicing machine comprising a pair of opposed seaming dies and means for simultaneously scrubbing the opposed surfaces of tube ends cuffed about said dies.

6. Apparatus for uniting the ends of a tubular body of plastic composition, said apparatus comprising a plurality of tube splicing machines, and means for advancing the machines step by step about a defined course, each tube splicing machine comprising a pair of opposed cutting and seaming dies, means for simultaneously scrubbing the opposed surfaces of tube ends cuffed about said dies, and means at a station along the course for pressing the scrubbed faces of the tube ends together by applying pressure to said dies.

7. Apparatus for uniting the ends of a tubular body of plastic composition, said apparatus comprising an independently movable tube splicing unit, and means for advancing it step by step about a defined course past a series of operating stations, said tube splicing unit comprising a pair of opposed cutting and seaming dies about which the tube ends may be cuffed, means at a station along the course for applying seaming pressure to the dies, and means for automatically moving the dies toward each other as the tube splicing unit approaches said station.

8. Apparatus for uniting the ends of a tubular body of plastic composition, said apparatus comprising an independently movable tube splicing unit, and means for advancing it step by step about a defined course past a series of operating stations, said tube splicing unit comprising a pair of opposed cutting and seaming dies about which the tube ends may be cuffed, means at a station along the course for applying seaming pressure to the dies, and means for automatically moving the dies away from each other as the tube splicing unit leaves the station.

9. Apparatus for uniting the ends of a tubular body of plastic composition, said apparatus comprising an independently movable tube splicing unit, and means for advancing it step by step about a defined course past a series of operating stations, said tube splicing unit comprising a pair of opposed cutting and seaming dies about which the tube ends may be cuffed, means at a station along the course for applying seaming pressure to the dies, and means at said station controlled by presence of said tube splicing unit for preventing application of seaming pressure when the tube seaming unit is out of alignment with the pressure applying means.

10. The method of uniting the ends of a tubular body of plastic composition which comprises cuffing the ends of the tubular body about the cutting edges of the opposed cutting and seaming dies of a tube seaming unit, feeding the tube-seaming unit step by step about a defined course past a series of operating stations, and applying pressure to the seam dies at a station along the course to unite the ends of the body.

11. The method of uniting the ends of a tubular body of plastic composition which comprises feeding a tube seaming unit comprising a pair of opposed cutting and seaming dies step by step about a defined course past a series of work stations, cuffing the ends of a tubular body about the cutting edges of the dies at one station, and applying pressure to the dies at another station to seam the ends of the body together.

12. The method of uniting the ends of a tubular body of plastic composition which comprises feeding a tube seaming unit comprising a pair of opposed cutting and seaming dies step by step about a defined course past a series of work stations, cuffing the ends of a tubular body about the cutting edges of the dies at one station, scrubbing the exposed faces of the tube ends at another station, and applying pressure to the dies at a third station to seam the ends of the body together.

13. Manufacturing apparatus comprising a plurality of stations for performing successive operations upon work presented thereto, a plurality of work-supporting units each comprising a movable base member and relatively movable article supporting members supported thereon, said work-supporting units each being capable of independent movement, means for individually advancing said units from station to station, and power means at a station for engaging a unit presented in approximate alignment with it for performing an operation upon the work.

14. Apparatus for uniting the ends of a tubular body of plastic composition, said apparatus comprising a plurality of tube splicing machines, a power applying station, means for advancing the machines step by step past said station, each tube splicing machine comprising a pair of opposed seaming dies, and detachable power means at said station for pressing the opposed dies together.

15. Apparatus for uniting the ends of a tubular body of plastic composition, said apparatus comprising a plurality of tube splicing machines, a power applying station, means for advancing the machines step by step past said station, each tube splicing machine comprising a base and a pair of opposed annular split cutting and seaming dies mounted thereon for movement one toward the other, and detachable power means at said station for pressing the opposed dies together.

16. Manufacturing apparatus comprising a plurality of work-supporting units each capable of independent movement and each comprising work-manipulating elements mounted thereon for relative movement, means for advancing said units in succession along a course, stationary means for moving said units in a generally lateral direction to a second course, means for moving said units in succession along said second course, and a plurality of power stations adapted to be connected to said units successively during their travel for operation of said work-manipulating elements.

CHARLES W. LEGUILLON.
OTTO F. HOMEIER.